United States Patent Office.

ORAZIO LUGO, OF BALTIMORE, MARYLAND.

*Letters Patent No.* 97,939, *dated December* 14, 1869; *reissue No.* 3,840, *dated February* 15, 1870.

IMPROVEMENT IN THE MANUFACTURE OF FERTILIZERS OR GUANO FROM FISH.

The Schedule referred to in these Letters Patent and making part of the same.

*To whom it may concern:*

Be it known that I, ORAZIO LUGO, of the city and county of Baltimore, and State of Maryland, have invented certain new and useful Improvements in Fertilizers or Guanos; and I do hereby declare the following to be a full and correct description thereof.

The nature of my invention consists in manufacturing an improved fertilizer from fish, by means of hot air or gas vapors, with or without solutions of benzole, benzines, light kerosene, and petroleum and phenol (carbolic acid) or its equivalents, each added successively in the manner hereafter more fully specified.

In order to enable those skilled in the science or art to apply my invention, I will proceed to describe the process.

The fish, whole or cut as may be deemed necessary, is put in a vessel that can be made air-tight, except having an inlet and an outlet. Connected with the inlet at the top of the vessel is an air-pump or blower, by means of which air (I prefer that the temperature should be between 170° to 190° Fahrenheit) is introduced and forced to pass through the fish, until about ninety per cent. of the water contained in said fish is extracted by the hot air.

This water that is carried off by the hot air is condensed in a condenser connected with the outlet of the vessel above mentioned.

When the operation has arrived at this point, the blast of hot air is cut off from the vessel, and a current of hydrocarbon and phenol (carbolic acid) vapors is introduced into the vessel, and is forced to pass through the fish by means of a current of air. The temperature must not be so high as to burn the fish.

The hydrocarbon and surplus phenol, having in solution the oils and fatty matters, are condensed in a condenser attached to the outlet of the vessel, and collected. The quantity of hydrocarbon and phenol to be added or used is regulated by the amount of fish being operated upon.

When the hydrocarbon and phenol vapors pass through the vessel unaffected, the supply is cut off, and the blast of not air is again introduced into the vessel, in order to expel the remaining portion of water and hydrocarbon.

The dry fish is then taken out of the vessel and ground or otherwise pulverized, and the antiseptic fertilizer is ready for use. The well-known antiseptic qualities of phenol (carbolic acid) remaining in a degree in the fertilizer prevents further decomposition, which can only take place at the expense of some of the valuable qualities of the fertilizer, if allowed to proceed.

The effect of the carbolic acid is also of great benefit in destroying obnoxious insects and animalculæ in the earth to which the fertilizer is applied.

When it is not desired to make an antiseptic fertilizer, the agencies of benzole, benzine, petroleum and phenol (carbolic acid) may be dispensed with, but in this case the drying process by means of the hot air is continued until a larger percentage than ninety per cent. of water is extracted.

Having thus described my invention and the process for preparing my fertilizer or guano,

What I claim as my invention, and desire to secure by Letters Patent of the United States, is—

1. The use of hot air, with or without the solution of benzole, benzine, light kerosene, and petroleum and phenol, (carbolic acid,) or its equivalents, for the purpose and in the manner substantially as herein set forth.

2. The use of the hydrocarbons, or their equivalents, in the connection herein described and for the purpose set forth.

3. The use of phenol (carbolic acid) or its equivalent, for the purpose and in the manner substantially as herein described.

4. As a new article of manufacture, the fertilizer or guano, prepared by treating fish in a kiln, vessel, or chamber, by means of currents of hot air, substantially as set forth.

ORAZIO LUGO.

Witnesses:

THEODORE HOOPER,

W. G. HENDERSON.